Sept. 29, 1953     H. P. JOHNSON     2,653,573
ANIMAL RESTRAINING CHUTE
Filed June 8, 1951
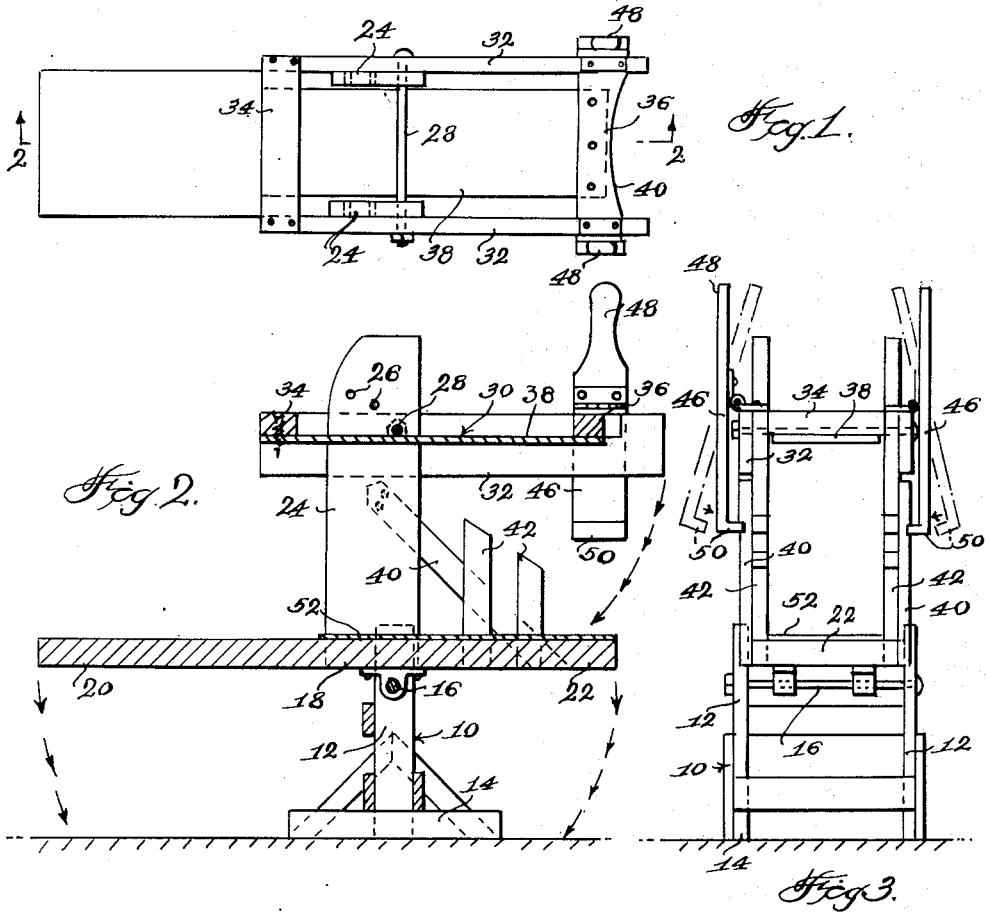
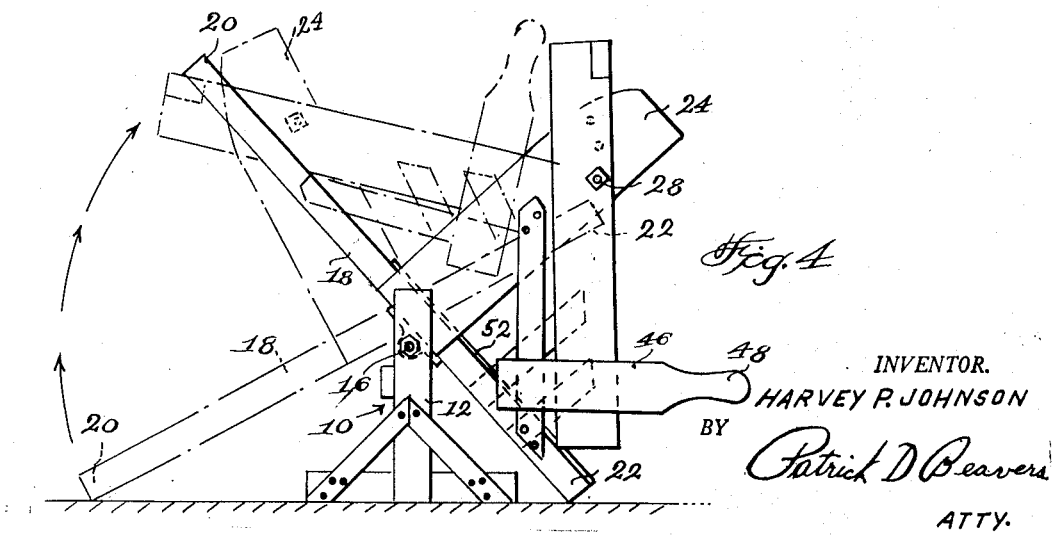
INVENTOR.
HARVEY P. JOHNSON
BY
Patrick D. Beavers
ATTY.

Patented Sept. 29, 1953

2,653,573

UNITED STATES PATENT OFFICE 2,653,573

ANIMAL RESTRAINING CHUTE

Harvey P. Johnson, Doniphan, Mo.

Application June 8, 1951, Serial No. 230,628

1 Claim. (Cl. 119—103)

This invention relates to an animal restraining chute and has for its primary object to hold an animal while performing an operation on it.

Another object is to so hold the snout of a hog while ringing it as to not only retain the snout against movement but also to keep the jaws of the animal closed so as to keep it from squealing and disturbing other animals.

A further object is to facilitate the release and discharge of a held animal when the operation has been completed.

The above and other objects may be attained by employing this invention which embodies among its features, a tilting platform onto which the animal is driven and which tilts under the weight of the animal to cause it to slide downwardly toward the discharge end of the device, a jaw pivotally supported above the platform to move toward the discharge end of the platform and form with said platform a chute having converging top and bottom walls between which the snout of the animal is clamped and manually released latch members carried by the jaw for holding it closed until such time as the animal is to be released.

Other features embody the gravity discharge of the animal from the chute when the latch members are manipulated to release the jaw and the gravity return of the platform to animal receiving position after the discharge of an animal therefrom.

In the drawing:

Figure 1 is a top plan view of an animal chute embodying the features of this invention;

Figure 2 is a longitudinal sectional view taken substantially on the line 2—2 of Figure 1;

Figure 3 is an end view of Figure 1, and

Figure 4 is a side view of the chute of Figure 1 showing in full lines the positions of the parts when an animal is confined therein and in broken lines the position of the parts when the chute is in animal receiving position.

Referring to the drawings in detail a stand designated generally 10 comprises a pair of spaced vertical uprights 12 supported in spaced parallel relation on a suitable base 14 and carrying adjacent their upper ends a horizontal shaft 16.

Mounted intermediate its ends for rocking movement on the shaft 16 is a platform 18 having a long end 20 and a short end 22 so that the platform will tilt by gravity into substantially the position illustrated by the broken lines in Figure 4.

Carried by the platform 18 at opposite side edges thereof and extending upwardly therefrom at a point adjacent the shaft 16 are spaced parallel arms 24 each having formed therein an inclined row of spaced openings 26 with the openings in one arm lying in axial alignment with those in the opposite arm. A horizontally extending pivot shaft 28 extends through oppositely disposed openings 26 and rockably supports a gravity actuated jaw member designated generally 30. This jaw member 30 comprises a pair of spaced parallel side bars 32 having a pair of aligned openings intermediate their ends for the reception of the pivot shaft 28 and connecting the side bars 32 adjacent opposite ends are end bars 34 and 36. A panel 38 is secured to the under sides of the cross bars 34 and 36 and the edge of the cross bar 36 remote from the cross bar 34 is preferably concave as at 40 to accommodate the snout of a hog or like animal occupying the platform 18. The openings in the side bars 32 are located nearer to the cross bar 34 than to the cross bar 36 so that the jaw member 30 will be unbalanced and cause the cross bar 36 to fall by gravity toward the end 22 of the platform 18.

A diagonal brace bar 40 is connected to each side of the platform 18 adjacent the end 22 and extends upwardly and rearwardly therefrom and is coupled to the arm 24 on its respective side of the device. These brace bars 40 form keepers for the latches carried by the jaw member, which will be more fully hereinafter described, and also serve as supports for upwardly extending pickets 42 carried by the platform 18 on opposite sides thereof.

Hingeably connected as at 44 to the jaw member 30 adjacent the ends of the cross bar 36 are levers 46 carrying at their upper ends upwardly extending handles 48 and at their lower ends inwardly extending latch tongues 50 which when the jaw member 30 is in closed position engage the under sides of the brace bars 40 to hold said jaw member 30 closed and against movement relative to the platform 18.

In use with the jaw member 30 closed and latched in closed position as shown in the full lines in Figure 4, the long end 20 of the platform moves by gravity into contact with the ground. An animal is then driven up the platform 18 toward the jaw member 30 until its weight tilts the platform about the shaft 16 into substantially the full line position shown in Figure 4. With the parts in this position the animal will slide downwardly along the short end 22 of the platform and beneath the jaw member 30 until its snout protrudes through the space between the platform 18 and the cross bar 36. When in this position the mouth of the animal is held closed by the platform 18 and the jaw member 30 so that a ring may be placed in the snout of the animal and it will be restrained from squealing or biting the operator. With the operation completed, the handles 48 of the levers 46 are moved on their respective hinges 44 into substantially the position shown in Figure 3 so as to withdraw the latch tongues 50 from engagement with the brace bars 40, thus enabling the jaw member 30 to swing away from the platform 18 by the pressure of the animal thereagainst. In this way the animal will be discharged by gravity from the chute. Upon the discharge of the animal, the weight of the jaw member 30 will return it to closed position and the weight of the end 20 of the platform will return it to its initial position. It only remains for the operator to manipulate the levers 24 and return the latch tongues 50 to their initial positions beneath the brace bars 40 to prepare the device for a repeat operation. In the preferred form of the invention the top of the portion of the platform lying between the arms 24 and the end 22 is coated with a layer of grease 52 to facilitate the sliding of the animal along the platform.

What is claimed is:

An animal chute comprising a stand, a horizontally extending shaft carried by the stand in spaced relation to the bottom thereof, an elongated platform rockably mounted on the shaft, the mounting of the platform being nearer one end of the platform than the other end to cause the platform to tilt under the influence of gravity, upwardly extending spaced parallel arms carried by the platform adjacent opposite ends of the shaft, said arms having downwardly inclined rows of aligning openings therein remote from the platform, a pivot shaft extending through aligning openings in the rows of openings, a pair of elongated side bars mounted on the pivot shaft for rocking movement thereabout, cross bars carried by and extending between the side bars to form an elongated jaw member having one end disposed above the normally upper end of the platform, the pivot shaft being located near the end of the jaw member remote from the end which cooperates with the platform to cause said jaw member to tilt by gravity toward the platform, diagonal brace bars connected to opposite sides of the jaw member and to the arms, upwardly extending pickets fixed to the platform and to the brace bars, and manually releasable latches carried by the jaw member adjacent opposite sides thereof for engaging the brace bars and holding the jaw member in closed relation to the platform, said brace bars and said jaw members being substantially parallel to each other when in such closed relation.

HARVEY P. JOHNSON.

References Cited in the file of this patent

UNITED STATES PATENTS

| Number | Name | Date |
|---|---|---|
| 54,023 | Sage | Apr. 17, 1866 |
| 60,262 | Saladee et al. | Dec. 4, 1866 |
| 545,415 | Schecher | Aug. 27, 1895 |
| 888,161 | Halley | May 19, 1908 |
| 1,717,532 | Trees | June 18, 1929 |